United States Patent

[11] 3,628,139

| [72] | Inventor | Henry J. Huber |
| | | Newton Highlands, Mass. |
| [21] | Appl. No. | 45,355 |
| [22] | Filed | June 11, 1970 |
| [45] | Patented | Dec. 14, 1971 |
| [73] | Assignee | Ikor, Incorporated |
| | | Burlington, Mass. |

[54] METHOD AND APPARATUS FOR SENSING PARTICULATE MATTER
19 Claims, 4 Drawing Figs.

[52] U.S. Cl. .................................................. 324/71 R, 340/237 S, 73/28
[51] Int. Cl. ........................................................ G01n 27/00
[50] Field of Search .......................................... 324/71, 32; 235/92 (30); 340/237 S; 73/194, 28, 29, 32, 61, 64, 432 PS

[56] References Cited
UNITED STATES PATENTS

| 1,070,556 | 8/1913 | Strong ........................... | 324/71 |
| 1,913,436 | 6/1933 | Eckstein ........................ | 324/71 |
| 2,732,753 | 1/1956 | O'Konski ....................... | 73/28 X |
| 2,932,966 | 4/1960 | Grindell ........................ | 73/28 |
| 3,261,199 | 7/1966 | Raynor ......................... | 73/28 |
| 1,168,227 | 1/1916 | Schmidt ........................ | 324/71 |

*Primary Examiner*—Michael J. Lynch
*Attorney*—Schiller & Pandiscio

ABSTRACT: A method and apparatus for sensing particulate matter in a fluid by application of an electrical field of sufficient potential to a flowing fluid so that a particle contained in the fluid causes an avalanche breakdown of the fluid dielectric. The breakdown rate is determined by the rate of particle flow through the field.

Patented Dec. 14, 1971     3,628,139

HENRY J. HUBER
INVENTOR.

BY *Schiller & Pandiscio*

ATTORNEYS.

METHOD AND APPARATUS FOR SENSING PARTICULATE MATTER

This invention relates to particle sensing, and more particularly to particle sensing for use in monitoring, sensing and recording particle content in such applications as the stack discharge from municipal and industrial incinerators, electric utility generating stations and similar applications.

Great attention is being given to the problem of pollution control. Devices are being installed to provide air and water pollution control of various types of industrial equipment which discharge pollutants at intolerable levels. Such pollution control equipment includes various types of particle precipitators and filters. A common precipitator is an electrostatic device wherein a corona discharge, provided for example by a charged wire, charges the particles in stack gases, thereby allowing them to be drawn to and precipitated upon an opposite polarity charged surface.

In order to determine the effectiveness of such electrostatic precipitators, it is desirable to monitor on a continuous basis the result of their operation. Therefore, it is an object of the present invention to provide a method and apparatus for continuously metering and permanently recording the particle content resulting from operation of pollution control devices. Another object of the present invention is to provide a method and apparatus for sensing particulate matter in a fluid. Still another object of the present invention is to provide a method and apparatus for sensing particulate matter in a fluid which includes a visual readout of particle content together with a permanent record for future inspection and which may also include audible alarms, indicating lights and other automatic devices which can be preset to be activated at predetermined levels of particle pollution or concentration in the fluid. Yet another object of the present invention is to provide a system for sensing particulate matter in a fluid flow; such a system may be operative directly at the source of the fluid flow or remotely therefrom, and may be calibrated to detect a wide range of particle densities.

The above objects, advantages and features of the method of the present invention, as well as others, are accomplished by flowing a fluid through an electrical field of sufficient potential so that a particle contained in the fluid flow causes an avalanche breakdown in the fluid at a rate substantially proportional to the rate of particle flow through the field. This breakdown is then detected.

The above objects, advantages and features of the apparatus of the present invention are accomplished by providing at least two spaced electrodes disposed so that the fluid flow can occur therebetween. Means are provided for applying an electrical potential across the electrodes of sufficient value so that a particle contained in the fluid flow causes an avalanche breakdown in the fluid, the rate of breakdown being proportional to the rate of particle flow. Means for electrically detecting the breakdown are provided.

Other objects of the invention will in part be obvious and will in part appear hereinafter. The invention accordingly comprises the method involving several steps and the relation and order of one or more of such steps with respect to each of the others, and the apparatus possessing the features, properties and relation of elements which are exemplified in the following detailed disclosure and the scope of the application all of which will be indicated in the claims.

For a fuller understanding of the nature and objects of the present invention, reference should be had to the following detailed description taken in connection with the accompanying drawings wherein like parts are designated in the several figures with like numerals and wherein.

Figures 1, 2:
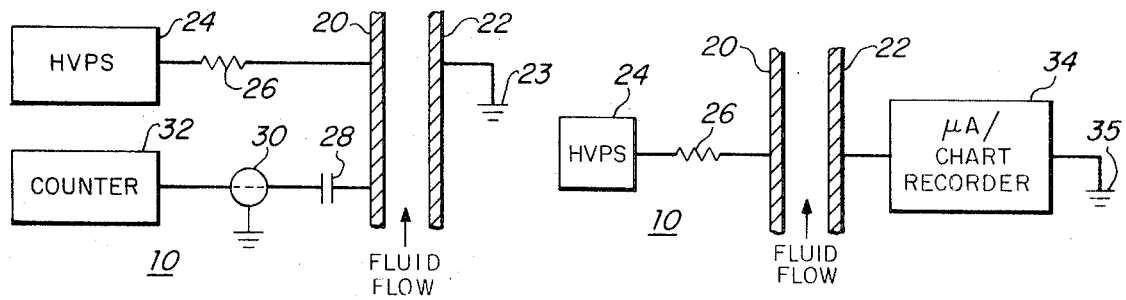
FIG. 1 is a schematic diagram showing the present invention with one sensing arrangement.
FIG. 2 is a schematic diagram showing the same invention as in FIG. 1 but with a different sensing arrangement.

FIGS. 1 and 2 show a particle sensing device 10 made in accordance with the present invention. Device 10 includes a pair of spaced electrodes 20 and 22 between which may pass a fluid flow indicated by the arrow and containing particulate matter. Connected to electrode 20 via a resistance represented by resistor 26 is a high-voltage power supply (HVPS) 24. The main difference between what is shown in FIGS. 1 and 2 is the nature of the readout of the particle content.

FIG. 1 provides a direct particle count of each selected particle which passes between the electrodes 20 and 22 in the fluid flow as will be explained with the operation. In FIG. 1 electrode 22 is connected to ground at a point 23. Connected to electrode 20 is one terminal of a capacitor 28, the other terminal of which is connected through shielded coaxial cable 30 to a digital-type counter 32 of any well-known design.

In the operation of FIG. 1 HVPS 24 supplies a high voltage to resistor 26 to apply a potential to electrode 20 which serves to build up a charge on capacitor 28. A fluid containing particles to be sensed flows between electrodes 20 and 22. When a selected particle passes between the electrodes an avalanche breakdown in the form of an arc or discharge in the fluid results. Substantially no corona discharge is present during the operation. No intentional net charge is placed on the particles before passing between the electrodes either by corona or other means. The particle flow causes a discharge of the energy represented by the charge stored on capacitor 28. The rate of discharge, i.e. the number of discharges per unit time, is determined by the rate of particle flow. The phrase "rate of particle flow" is intended to mean either or both the rate of particle mass flow between the electrodes and the rate of the number of particles flowing between the electrodes. This discharge creates a high-frequency voltage pulse which is coupled through capacitor 28 to coaxial cable 30 which transmits this pulse to counter 32 to be recorded as a count representing the particles just sensed. Device 10 does not necessarily count each particle in the fluid flow but only those for which the dimensions and voltage applied to the electrodes will create a voltage pulse above the threshold of the counter. The rate of electrical breakdown in the fluid is substantially proportional to the rate of particle flow through the field.

The device 10 in FIG. 2, on the other hand provides an analog readout of current level which represents the particle density level sensed by the device. Connected to electrode 22 is an indicating system 34 which may include a permanent-record-type device, such as a chart recorder, and/or connected in series therewith a device for indicating the instantaneous current level, such as a microammeter (ma.). The output of indicating system 34 is connected to ground as shown at 35. The chart recorder and microammeter may each be any one of a number of well known such devices. Instead of providing a digital readout or count of the particles passing between the electrodes as in FIG. 1, the device of FIG. 2 provides a steady state or analog level in that it is an integrated system for measuring current level representing particle density level sensed by the device. In all other respects the principle of operation is identical to the device in FIG. 1.

Figure 3:
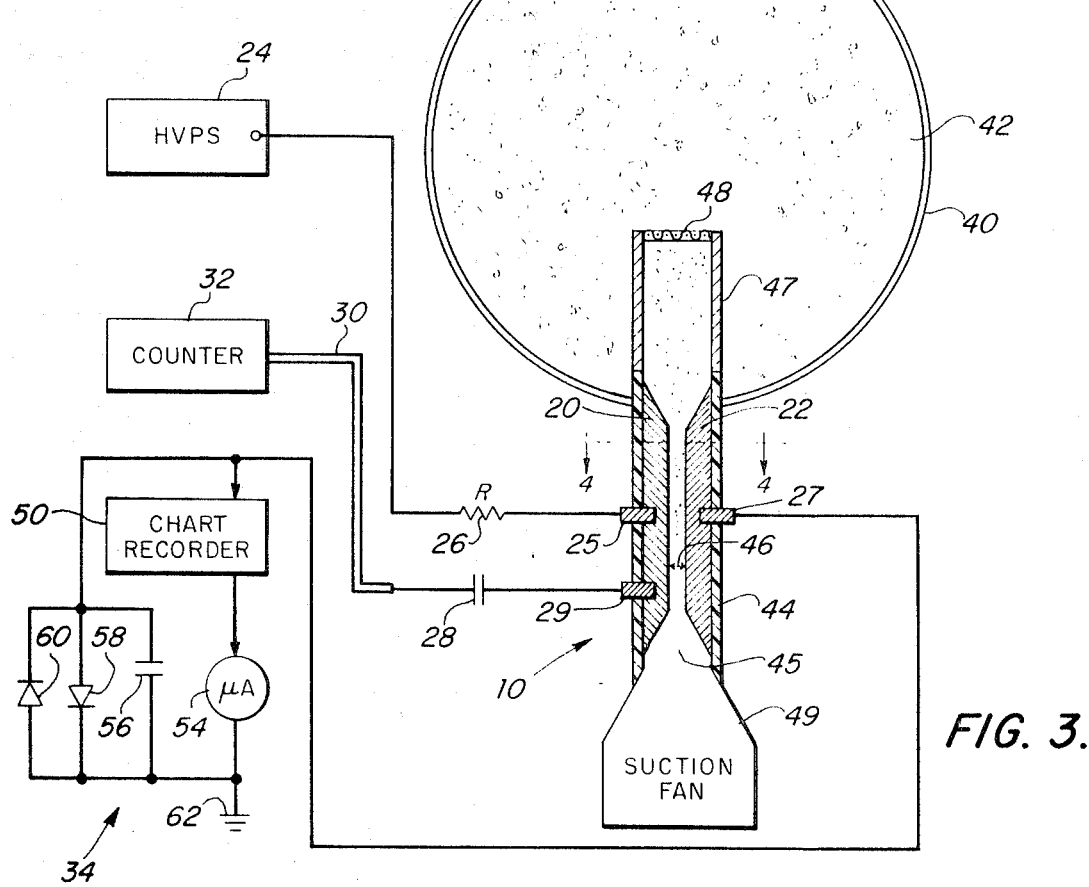
FIG. 3 is a diagram showing the details of the present invention in a specific application.
Figure 4:
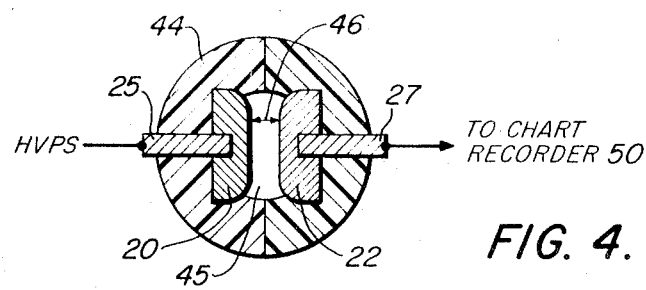
FIG. 4 is a cross-sectional view of the invention shown in FIG. 3 taken along line 4—4.

Of course, the different measuring or indicating techniques of FIGS. 1 and 2 could be combined into a single system as shown in FIG. 3. FIG. 3, shows a specific embodiment of the structural details and operational parameters and an application of the present invention. The device 10 in FIG. 3 is used to sense particle content in the gas contained in a flue or smokestack 40, a top view of which is shown, and containing flue gas 42 therein. The device 10 includes spaced electrodes 20 and 22. Although the embodiment shows two electrodes defining a single gap a multiplicity of pairs spaced electrodes may be employed to define either a plurality of series-positioned gaps or parallel-positioned gaps. Such multiple gap arrangements could be used to make the device more sensitive with respect to different particle sizes. Each electrode 20 and 22 has an electrical connector 25 and 27 respectively connected thereto. Electrodes 20 and 22 are mounted in the inner walls of opposite halves of substantially semicylindrically shaped Teflon members which when seamed together form a housing 44 (See FIG. 4). Housing 44 is open at both ends 45 and electrodes 20 and 22 are spaced from one another by a gap or spacing 46 so that a fluid may pass into housing 44 at one end between the electrodes and out the other end of housing 44.

Affixed to the end of housing 44 which is positioned inside smokestack 40 is a sampling nozzle 47 which has a screen 48 covering the mouth thereof. Screen 48 is used to filter out the particles of the same or greater size than the spacing between the electrodes before the fluid flow is passed between the electrodes. Instead of a screen an intake configuration on the end of nozzle 47 configured to deflect the larger undesired particles could be employed. Nozzle 47 is shown as being positioned with its axis substantially orthogonal to the central axis of smokestack 40. However, nozzle 47 may also be elbow-shaped so that the inlet portion of the nozzle through which the fluid may enter has its central axis substantially parallel to the fluid flow in the direction along the central axis of the smokestack. Mounted adjacent the open end 45 of housing 44 opposite nozzle 47 is a suction fan 49. Fan 49 is generally of the turbine or impeller type suction fan and must provide sufficient suction to draw the fluid being measured through the device between electrodes 20 and 22 at the typical flow rates which will be described later. The materials of which fan 49 are made must be capable of withstanding the temperature environment to which it is subjected. In the case of flue gases, temperatures may reach as high as 800° F. or higher.

HVPS 24 is connected to resistor 26 which is connected to electrode 20 via connector 25 which extends from electrode 20 through the outer surface of housing 44. One terminal of capacitor 28 is shown as connected through the surface of housing 44 to electrode 22 by a connector 29 and the other terminal of capacitor 28 is connected to coaxial cable 30 which connects to counter 32. Connector 27 extends from electrode 22 through the outer surface of housing 44. Connector 27 is electrically connected to a chart recorder 50 which is connected in series with a microammeter 54. Meter 54 is connected to ground at 62. Connected across the recorder 50 and meter 54 is the parallel combination of a capacitor 56 and two back-to-back diodes 58 and 60. Since device 10 generates current pulses of fairly high amplitude and frequency, capacitor 56 smooths out the short term fluctuations applied to recorder 50 and meter 54. Diodes 58 and 60 provide transient voltage protection for the recorder and meter.

In the operation of the device 10 shown in FIG. 3 flue gas 42 flowing through stack 40 is drawn into sampling nozzle 47 by the operation of suction fan 49. Screen 48 prevents gross particles of larger size than it is desired to sense from being pulled into device 10. As the particles contained in the gas pass between the electrodes charged by HVPS 24, they produce arcs or discharges which are sent to counter 32 as explained in conjunction with operation of FIG. 1. As described in conjunction with operation of FIG. 2, chart recorder 50 makes a permanent record of the electrical current level sensed by device 10 and meter 54 provides a visual display of the instantaneous current level being sensed.

The various parameters of the device and their relationship to one another will now be described. Preferably electrodes 20 and 22 provide a uniform electric field, i.e. they are contoured such as to have a uniform field thereacross as opposed to point electrodes or wires which produce a point or area-concentrated type of field. However, certain configurations of nonuniform field electrodes may also operate satisfactorily. The electrodes may be made of any conductive or semiconductive material but they must be substantially chemically inert to the fluid and to the reaction products of the avalanche breakdown of the fluid. In one operative embodiment electrodes 20 and 22 are made of aluminum and are each approximately three-fourths X three-eighths inch in cross section and 5 inches long. Another very good material for the electrodes is polished stainless steel upon whose smooth surface the particles in the fluid do not deposit.

Housing 44 is made of Teflon material (Teflon is a trademark of E. I. DuPont de Nemours Co. for tetrafluorethylene) in the embodiment shown but any material may be used which has the properties of (1) a relatively smooth, nonstick surface to which adherence of the particles is minimized, (2) relatively high electrical and temperature resistivity, and (3) nonporosity. A glazed ceramic material would serve very well for housing 44 in a very high temperature environment. In the operative embodiment referred to in the preceding paragraph, the housing is made of Teflon and is 6 inches long.

The gap or spacing 46 between the electrodes 20 and 22 must be sufficiently large so as to permit fluid flow between the electrodes. Further, gap 46 must be larger than the diameter of the largest particle flowing therethrough and must satisfy the equation:

$$D_G > D_p \quad (1)$$

where $D_G$ is the shortest distance across the gap 46 and $D_p$ is the diameter or greatest dimension of the largest particle in the fluid flowing between the electrodes. In this regard the size particles being sensed are generally several orders of magnitude smaller than the minimum operable electrode spacing. The size of the gap or spacing 46 between the electrodes may vary from approximately 0.01 inches to 0.5 inches. A typical particle size is approximately 100 microns in diameter and the range of particle sizes generally being sensed is approximately between 1 to 500 microns in diameter.

Whatever the size of the gap or spacing 46 which is used, that particular gap has an associated breakdown or discharge potential for a given dielectric gas or fluid at standard pressure and temperature. It has been found that operating the HVPS24 at approximately between 75 to 90 percent of the breakdown potential corresponding to the size gap used is most efficient. In operation with gases it has been found that the particular gas being measured does not have much effect on the breakdown potential of a particular gap size. The minimum requirement on the potential of the HVPS is that the potential applied to the electrodes must be sufficiently different than the breakdown potential across the electrodes to avoid a false detection or electrical discharge, i.e. a discharge in the fluid in the absence of a particle. If the potential applied is too close to the breakdown potential of the gap used, then a false detection would result. The potential for the HVPS is a steady state voltage in the range between approximately 1,000 volts to 50,000 volts, depending on the gap size and other parameters. Much below 1,000 volts it is difficult to achieve sparking or discharge in the fluid. The upper limit of 50,000 volts is a limit only because sensing device and associated equipment become unwieldy in size and cost and the insulation problems become acute.

The temperature of the fluid flowing between the electrodes does have some effect on the potential which must be applied to the electrodes. As mentioned earlier in the case of flue gases temperatures as high as approximately 800° F. or higher exist. If the temperature of the fluid rises, the potential applied to the electrodes must be lowered somewhat. If the temperature of the fluid falls, the potential applied to the electrodes must be raised somewhat. The relationship which must be maintained between temperature and potential is approximately inversely proportional. Although no temperature feedback arrangement is shown in FIG. 3, it would be relatively simple to install a temperature sensor in the fluid flow between the electrodes whose output would be used to automatically control the potential of the HVPS 24.

The pressure of the fluid flowing between the electrodes does have some effect on the potential which must be applied to the electrodes. If the pressure of the fluid increases, the dielectric strength of the fluid increases thereby requiring a higher potential to achieve breakdown. If the pressure of the fluid decreases, the potential applied to the electrodes must be decreased somewhat. The relationship which must be maintained between pressure and potential is approximately proportional. Although no pressure feedback arrangement is shown in FIG. 3, it would be relatively simple to install a pressure sensitive device in the fluid flow between the electrodes whose output would be used to automatically control the potential of the HVPS 24.

Another operating parameter which must be considered is the flow rate of the fluid through device 10. In order to obtain reliable results the velocity of fluid into the housing 44 through sampling nozzle 47 should substantially equal the velocity of the fluid in the smokestack or other conduit being checked. In the example described in FIG. 3 the velocity of gas into nozzle 47 should substantially equal the velocity of gases flowing through the stack 40. This sampling condition is referred to as isokinetic sampling and may be expressed as:

$$V_F \approx V_S \quad (2)$$

where $V_F$ is the velocity of fluid into the sampling nozzle of the sensing device and $V_S$ is the velocity of the fluid flowing in the smokestack or other conduit being checked by the sensing device. If the velocity into the nozzle is slower or faster than the velocity of the fluid flow in the stack, i.e. sampling is not isokinetic, then a true or typical characteristic measurement for the particular fluid being measured is not being obtained. In the case of flue gases, stack velocities may run as high as 90 feet/second or higher. for a typical sensing device to operate isokinetically, a flow rate into a nozzle of 1 inch diameter of approximately 4 cubic feet/minute and higher would be necessary. The flow velocity of the fluid as it actually passes between the electrodes must be sufficiently high to prevent collection or deposit of particles on the electrodes or insulating housing. The particles must pass completely through the area defined by the spacing between the electrodes. In this regard in the example in FIG. 3, the suction fan 49 must provide sufficient flow rate to draw the gases being measured all the way through device 10.

In an operative embodiment of the present invention, a number of different types of particle materials in a fluid medium of air were sensed by the device. These materials included both coarse and fine sand, alumina powder, chalk dust and pike smoke. In one test using three-fourths cubic inches of sand, the sensing device counted 5,000 counts in less than 1 minute.

Since certain changes may be made in the above method and apparatus without departing from the scope of the invention herein involved, it is intended that all matter contained in the above description or shown in the accompanying drawing shall be interpreted in an illustrative and not in a limiting sense.

What is claimed is:

1. Apparatus for sensing particulate matter in a gas flow, said apparatus comprising:
   at least two spaced electrodes disposed so that gas can pass therebetween:
   means for sampling a selected portion of said gas flow;
   means for forcing all of said portion of said gas to flow between said electrodes;
   means for applying a DC electrical potential across said electrodes of sufficient value so that particles within a desired range of dimensions contained in said portion cause avalanche breakdowns in said gas when passing between said electrodes, the rate of breakdown being proportional to the rate at which particles pass between said electrodes; and
   means for electrically detecting said breakdowns and for providing thereby signals representative of the last-mentioned rate.

2. Apparatus as defined in claim 1 wherein said apparatus further including means for providing a sampled flow of said gas between said electrodes at a sufficient velocity substantially to prevent deposit of any particles on said electrodes.

3. Apparatus as defined in claim 1 wherein said electrodes are made of a material which is substantially chemically inert to said gas and to the reaction products of avalanche breakdown of said gas.

4. Apparatus as defined in claim 1 wherein said potential applied to said electrodes is of a value sufficiently different than the breakdown potential across said electrodes in order to avoid an electrical discharge in the absence of a particle.

5. Apparatus as defined in claim 1 wherein said means for detecting includes means for providing a count of each particle sensed by said apparatus.

6. Apparatus as defined in claim 1 wherein said means for detecting includes means for providing a record of the electrical current level sensed by said apparatus.

7. Apparatus as defined in claim 2 wherein said electrodes are made of aluminum.

8. Apparatus as defined in claim 2 wherein said electrodes are made of polished stainless steel.

9. Apparatus as defined in claim 2 wherein said electrodes are contained in a substantially cylindrical, hollow, insulating housing.

10. Apparatus as defined in claim 9 wherein said housing is made of a material to which adherence of said particles is minimized.

11. Apparatus as defined in claim 10 wherein said housing is made of tetrafluorethylene.

12. Apparatus as defined in claim 2 wherein said gap is approximately between 0.01 to 0.5 inches.

13. Apparatus as defined in claim 2 wherein said potential is a substantially steady state voltage in the range between approximately 1,000 to 50,000 volts.

14. Apparatus as defined in claim 2 wherein said means for providing a sampled flow includes suction fan means.

15. Apparatus as defined in claim 2 further including means for filtering any particles of the same or greater size than the spacing between electrodes before said fluid flow is passed between said electrodes.

16. Apparatus as defined in claim 2 wherein said electrodes are shaped so as to provide a substantially uniform electrical field.

17. A method for sensing particulate matter in a gas flow, the method comprising the steps of:
    sampling a selected portion of said gas flow isokinetically;
    flowing all of said selected portion of said sampled gas through an electrical field of sufficient DC potential so that particles within a desired range of dimensions and contained in said selected portion of said gas flowing in said field cause avalanche breakdowns in said gas, the rate of breakdown being substantially proportional to the rate of particle flow through said field, said gas flow through said field being of sufficient velocity to substantially prevent any particles from remaining within said field; and
    detecting said breakdowns and providing thereby signals representative of the last-mentioned rate.

18. Apparatus as defined in claim 1 wherein said rate of breakdown is proportional to the mass flow rate at which particles pass between said electrodes.

19. Apparatus as defined in claim 2 wherein said sampled flow is provided isokinetically.

* * * * *